US010412195B2

(12) United States Patent
Hwang et al.

(10) Patent No.: US 10,412,195 B2
(45) Date of Patent: Sep. 10, 2019

(54) RISK-AWARE SERVICE MANAGEMENT STACK TRANSFORMATION DURING WORKLOAD MIGRATION

(71) Applicant: International Business Machines Corporation, Armonk, NY (US)

(72) Inventors: Jinho Hwang, Ossining, NY (US); Clifford A. Pickover, Yorktown Heights, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 15/275,866

(22) Filed: Sep. 26, 2016

(65) Prior Publication Data

US 2018/0091625 A1 Mar. 29, 2018

(51) Int. Cl.
*G06F 15/173* (2006.01)
*H04L 29/08* (2006.01)
*H04L 12/24* (2006.01)

(52) U.S. Cl.
CPC .......... *H04L 67/34* (2013.01); *H04L 41/0803* (2013.01); *H04L 41/0813* (2013.01); *H04L 67/10* (2013.01); *H04L 67/14* (2013.01)

(58) Field of Classification Search
None
See application file for complete search history.

(56) References Cited

U.S. PATENT DOCUMENTS

| 8,775,376 | B2 | 7/2014 | Chavda et al. |
| 8,832,032 | B2 | 9/2014 | O'Connor et al. |
| 2008/0126356 | A1* | 5/2008 | Guo ........................ H04L 67/16 |

(Continued)

FOREIGN PATENT DOCUMENTS

| WO | WO 2014007811 A1 | 1/2014 |
| WO | WO 2014021849 A1 | 2/2014 |

OTHER PUBLICATIONS

Mell et al., "The NIST Definition of Cloud Computing," National Institute of Standards and Technology Special Publication 800-145, Sep. 2011, 7 pages.

*Primary Examiner* — Phyllis A Book
(74) *Attorney, Agent, or Firm* — Yee & Associates, P.C.; JoAnn Crockatt

(57) ABSTRACT

Performing a risk-aware transformation of a service management stack during workload migration is provided. A set of workloads for migration from a source environment to a target environment is identified in response to receiving a request to migrate the set of workloads. The migration of the set of workloads is initiated from the source environment to the target environment. A service management stack configuration transformation from a service management stack configuration corresponding to the source environment to a set of service management stack configurations corresponding to the target environment is performed based on semantic matching between functions of the service management stack configuration corresponding to the source environment and functions of the set of service management stack configurations corresponding to the target environment, a state of the source environment, service management stack configuration transformation actions, and a goal state of the target environment.

16 Claims, 13 Drawing Sheets

(56) References Cited

U.S. PATENT DOCUMENTS

| | | | |
|---|---|---|---|
| 2009/0070771 A1* | 3/2009 | Yuyitung | G06Q 10/06 718/105 |
| 2011/0078129 A1* | 3/2011 | Chunilal | G06F 17/30867 707/706 |
| 2012/0054731 A1* | 3/2012 | Aravamudan | G06F 8/63 717/170 |
| 2012/0072903 A1* | 3/2012 | Joukov | G06F 8/63 717/175 |
| 2012/0131567 A1* | 5/2012 | Barros | G06F 9/5088 717/170 |
| 2014/0046997 A1* | 2/2014 | Dain | H04L 67/2861 709/201 |
| 2014/0075412 A1* | 3/2014 | Kannan | H04L 41/5016 717/120 |
| 2014/0149494 A1* | 5/2014 | Markley | H04L 67/34 709/203 |
| 2014/0149591 A1* | 5/2014 | Bhattacharya | H04L 67/1097 709/226 |
| 2014/0149983 A1* | 5/2014 | Bonilla | G06F 9/45558 718/1 |
| 2014/0165063 A1* | 6/2014 | Shiva | G06F 9/45533 718/1 |
| 2014/0172954 A1* | 6/2014 | Salsburg | H04L 67/10 709/203 |
| 2015/0019195 A1* | 1/2015 | Davis | G06F 11/3442 703/17 |
| 2015/0106485 A1* | 4/2015 | Chaudhuri | H04L 41/145 709/220 |
| 2016/0254957 A1* | 9/2016 | Maes | G06F 17/30557 709/223 |

* cited by examiner

GUI 700

Application Portfolio Overview: Application Readiness for Cloud Runtime

Click on application name to view more details or select qualifying application for transformation:

| Application Name | Business Criticality Value | Topology | Middleware | Connectivity | HA Requirements | Code Complexity | Data Sensitivity | Cloud Readiness | |
|---|---|---|---|---|---|---|---|---|---|
| Shopping Cart | Platinum | 8 servers | websphere db2 | 10 external connections | HA cluster | 16000 lines | high | Not Ready | ☐ |
| Payroll | Silver | 3 servers | websphere jboss db2 mqueue | 2 external connections | load balancer | 5000 lines | medium | Major fixups | ☐ |
| PlantsByWebSphere | Bronze | 2 servers | websphere derbydb | 1 external connection | load balancer | 2000 lines | low | Minor fixups | ☐ |

702　　　704　　　706　　　708　　　710

| App Name | Services | Degree of Semantic Match | Criticality of mismatches (1 low - 5 high) | Gaps in functions |
|---|---|---|---|---|
| Shopping Cart | Backup Management | 80% | 5 | Scheduling |
| Shopping Cart | Monitoring Service | 70% | 3 | Node Registration |
| Shopping Cart | SingleSign On | 90% | 2 | HTTPS |

FIG. 7

RISK-AWARE SERVICE MANAGEMENT STACK TRANSFORMATION DURING WORKLOAD MIGRATION

BACKGROUND

1. Field

The disclosure relates generally to workload migration and more specifically to performing a risk-aware transformation of a service management stack corresponding to a set of workloads during migration of the set of workloads from a source virtual machine environment to a target virtual machine environment.

2. Description of the Related Art

Migration to a hybrid cloud environment not only requires workload migration, but also service management stack migration. The migration of the set of workloads is initiated from the source environment to the target environment, along with transformation of service management stack corresponding to the set of workloads. However, a need exists for management of a hybrid cloud service that depends on services in one or more environments and for automated discovery of transformation patterns and conflict resolution.

SUMMARY

According to one illustrative embodiment, a computer-implemented method for performing a risk-aware transformation of a service management stack during workload migration is provided. A computer identifies a set of workloads for migration from a source environment to a target environment in response to receiving a request to migrate the set of workloads. The computer initiates the migration of the set of workloads from the source environment to the target environment. The computer performs a service management stack configuration transformation from a service management stack configuration corresponding to the source environment to a set of service management stack configurations corresponding to the target environment based on semantic matching between functions of the service management stack configuration corresponding to the source environment and functions of the set of service management stack configurations corresponding to the target environment, a state of the source environment, service management stack configuration transformation actions, and a goal state of the target environment. According to other illustrative embodiments, a computer system and computer program product for performing a risk-aware transformation of a service management stack during workload migration are provided.

BRIEF DESCRIPTION OF THE DRAWINGS

FIG. 7 is an example of a graphical user interface in accordance with an illustrative embodiment;

DETAILED DESCRIPTION

Figure 1:
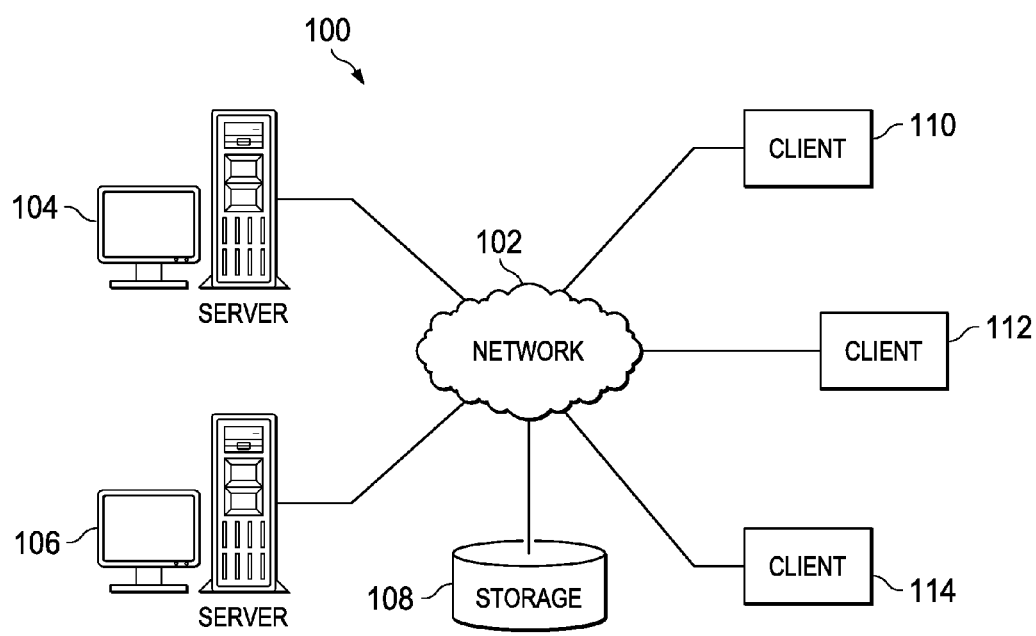
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide services, such as, for example, managing client workload migration from a source virtual machine environment, such as a data center environment, to a target virtual machine environment, such as a cloud computing environment. Further, server 104 and server 106 may manage, for example, service management stack configuration transformation from a service management stack configuration corresponding to the source virtual machine environment to a set of service management stack configurations corresponding to the target virtual machine environment during migration of the client workload from the source virtual machine environment to the target virtual machine environment.

Client 110, client 112, and client 114 also connect to network 102. Clients 110, 112, and 114 are clients of server 104 and server 106. Server 104 and server 106 may provide information, such as boot files, operating system images, virtual machine images, and software applications to clients 110, 112, and 114.

In this example, clients 110, 112, and 114 each represent a different virtual machine environment. A virtual machine environment includes physical resources used to host and execute virtual machines to perform a set of one or more workloads or tasks. A virtual machine environment may comprise, for example, one server, a rack of servers, a cluster of servers, such as a data center, a cloud of computers, such as a private cloud, a public cloud, or a hybrid cloud, or any combination thereof. However, it should be noted that clients 110, 112, and 114 are intended as examples only. In other words, clients 110, 112, and 114 may include other types of data processing systems, such as, for example, network computers, desktop computers, laptop computers, tablet computers, handheld computers, smart phones, smart watches, personal digital assistants, and gaming devices.

Storage 108 is a network storage device capable of storing any type of data in a structured format or an unstructured format. In addition, storage 108 may represent a plurality of network storage devices. The type of data stored in storage 108 may be, for example, lists of source virtual machine environments with corresponding service management stack configurations, lists of target virtual machine environments with corresponding service management stack configurations, information regarding functions and function characteristics of each service management stack, and service management stack configuration transformation plans for transforming a source environment's service management stack configuration to a target environment's service management stack configuration during migration of a workload from the source environment to the target environment. Further, storage unit 108 may store other types of data, such as authentication or credential data that may include user names, passwords, and biometric data associated with system administrators and workload migration engineers, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
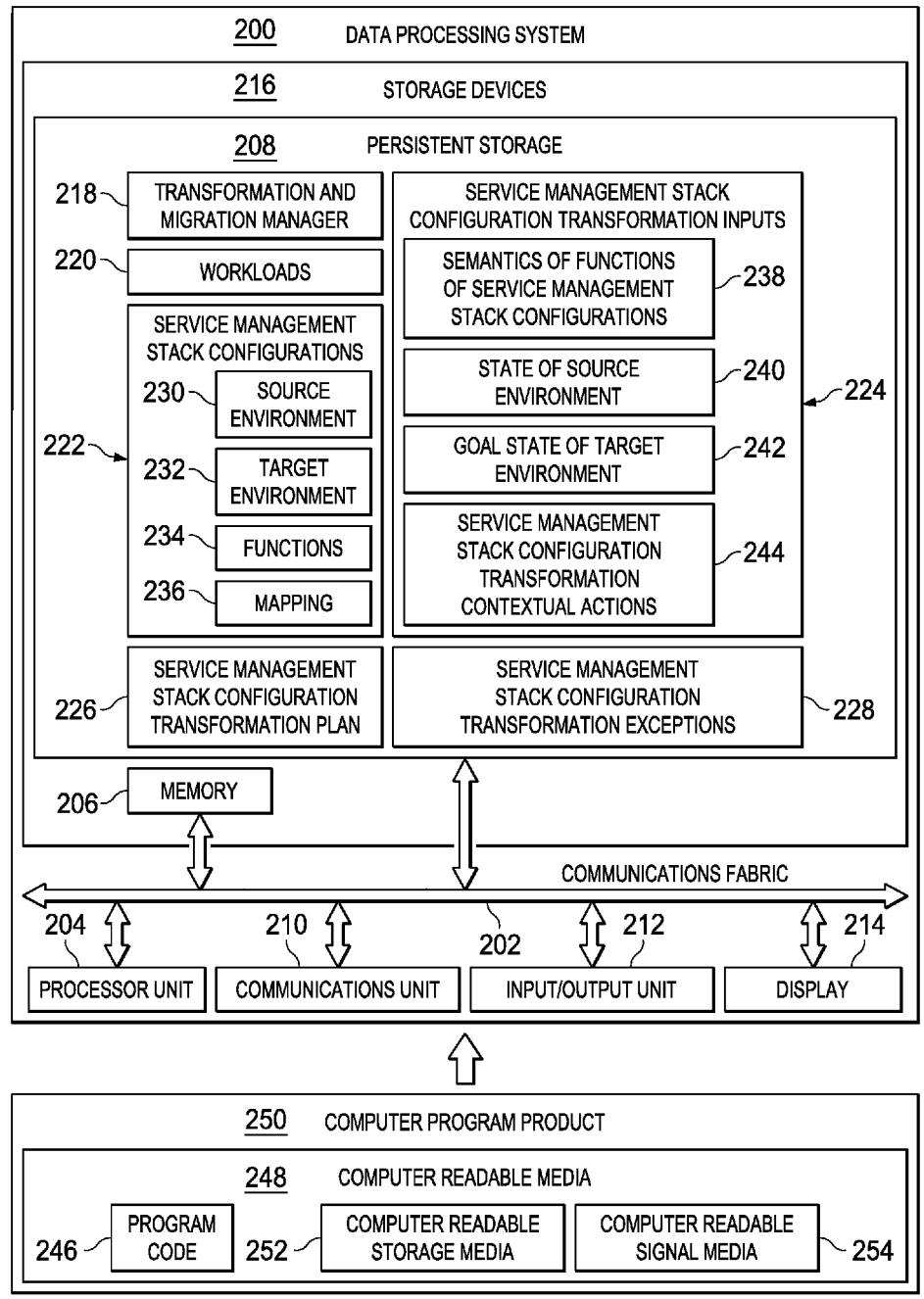
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores transformation and migration manager 218, workloads 220, service management stack configurations 222, service management stack configuration transformation inputs 224, service management stack configuration transformation plan 226, and service management stack configuration transformation exception 228. However, illustrative embodiments are not limited to such. In other words, illustrative embodiments may store more or less information in persistent storage 208 than illustrated.

Transformation and migration manager 218 controls the migration of a set of one or more client workloads, such as workloads 220, from a source virtual machine environment to a target virtual machine environment. The source virtual machine environment may be, for example, client 110 in FIG. 1. The target virtual machine environment may be, for example, client 112 in FIG. 1. Further, transformation and migration manager 218 controls the service management stack configuration transformation from a service management stack configuration corresponding to the source environment to a service management stack configuration corresponding to the target environment. It should be noted that even though transformation and migration manager 218 is illustrated as residing in persistent storage 208, in an alternative illustrative embodiment transformation and migration manager 218 may be a separate component of data processing system 200. For example, transformation and migration manager 218 may be a hardware component coupled to communication fabric 202 or a combination of hardware and software components.

Workloads 220 represent a list of different workloads that transformation and migration manager 218 is to migrate from the source environment to the target environment. Service management stack configurations 224 represent the service management stack configurations corresponding to the source and target environments, such as source environment 230 and target environment 232. Source environment 230 may represent, for example, a data center environment. Target environment 232 may represent, for example, a cloud environment. Functions 234 represent the different functions corresponding to the service management stacks of source environment 230 and target environment 232 and may include, for example, monitoring functions, such as a network monitoring function, a service monitoring function, a performance monitoring function, a migration monitoring function, and the like. Functions 234 also may include a security compliance function, a regulation compliance checking function, a data backup function, a scheduling function, and the like. Mapping 236 represents a semantic mapping or matching between function descriptions of the source environment's service management stack and the function descriptions of the target environment's service management stack.

Transformation and migration manager 218 utilizes service management stack configuration transformation inputs 224 to transform the service management stack configuration corresponding to source environment 230 to the service management stack configuration corresponding to target environment 232. In this example, service management stack configuration transformation inputs 224 include semantics of functions of service management stack configurations 238, state of source environment 240, goal state of target environment 242, and service management stack configuration transformation contextual actions 244. Semantics of functions of service management stack configurations 238 are descriptions of functions 234 corresponding to service management stack configurations 222. State of source environment 240 is a current state of source environment 230 prior to migration of workloads 220. Goal state of target environment 242 is a goal state of target environment 232 after migration of workloads 220. Service management stack configuration transformation contextual actions 244 represent a set of one or more action steps that transformation and migration manager 218 takes to achieve the service management stack configuration transformation from the service management stack configuration corresponding to source environment 230 to the service management stack configuration corresponding to target environment 232.

Service management stack configuration transformation plan 226 represents a strategy for transforming the service management stack configuration corresponding to source environment 230 to the service management stack configuration corresponding to target environment 232. Transformation and migration manager 218 generates service management stack configuration transformation plan 226 based on information in workloads 220, service management stack configurations 222, and service management stack configuration transformation inputs 224. Service management stack configuration transformation exception 228 represent a possible exception that may be thrown when transformation and migration manager 218 executes service management stack configuration transformation plan 226. Service management stack configuration transformation exception 228 may be, for example, an unknown service management stack configuration transformation pattern exception, a new service management stack technology exception, a detected service management stack misconfiguration exception, or an unknown exception.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 246 is located in a functional form on computer readable media 248 that is selectively removable and may be loaded onto or transferred to data processing system 200 for running by processor unit 204. Program code 246 and computer readable media 248 form computer program product 250. In one example, computer readable media 248 may be computer readable storage media 252 or computer readable signal media 254. Computer readable storage media 252 may include, for example, an optical or magnetic disc that is inserted or placed into a drive or other device that is part of persistent storage 208 for transfer onto a storage device, such as a hard drive, that is part of persistent storage 208. Computer readable storage media 252 also may take the form of a persistent storage, such as a hard drive, a thumb drive, or a flash memory that is connected to data processing system 200. In some instances, computer readable storage media 252 may not be removable from data processing system 200.

Alternatively, program code 246 may be transferred to data processing system 200 using computer readable signal media 254. Computer readable signal media 254 may be, for example, a propagated data signal containing program code 246. For example, computer readable signal media 254 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 246 may be downloaded over a network to persistent storage 208 from another device or data processing system through computer readable signal media 254 for use within data processing system 200. For instance, program code stored in a computer readable storage media in a data processing system may be downloaded over a network from the data processing system to data processing system 200. The data processing system providing program code 246 may be a server computer, a client computer, or some other device capable of storing and transmitting program code 246.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 252 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
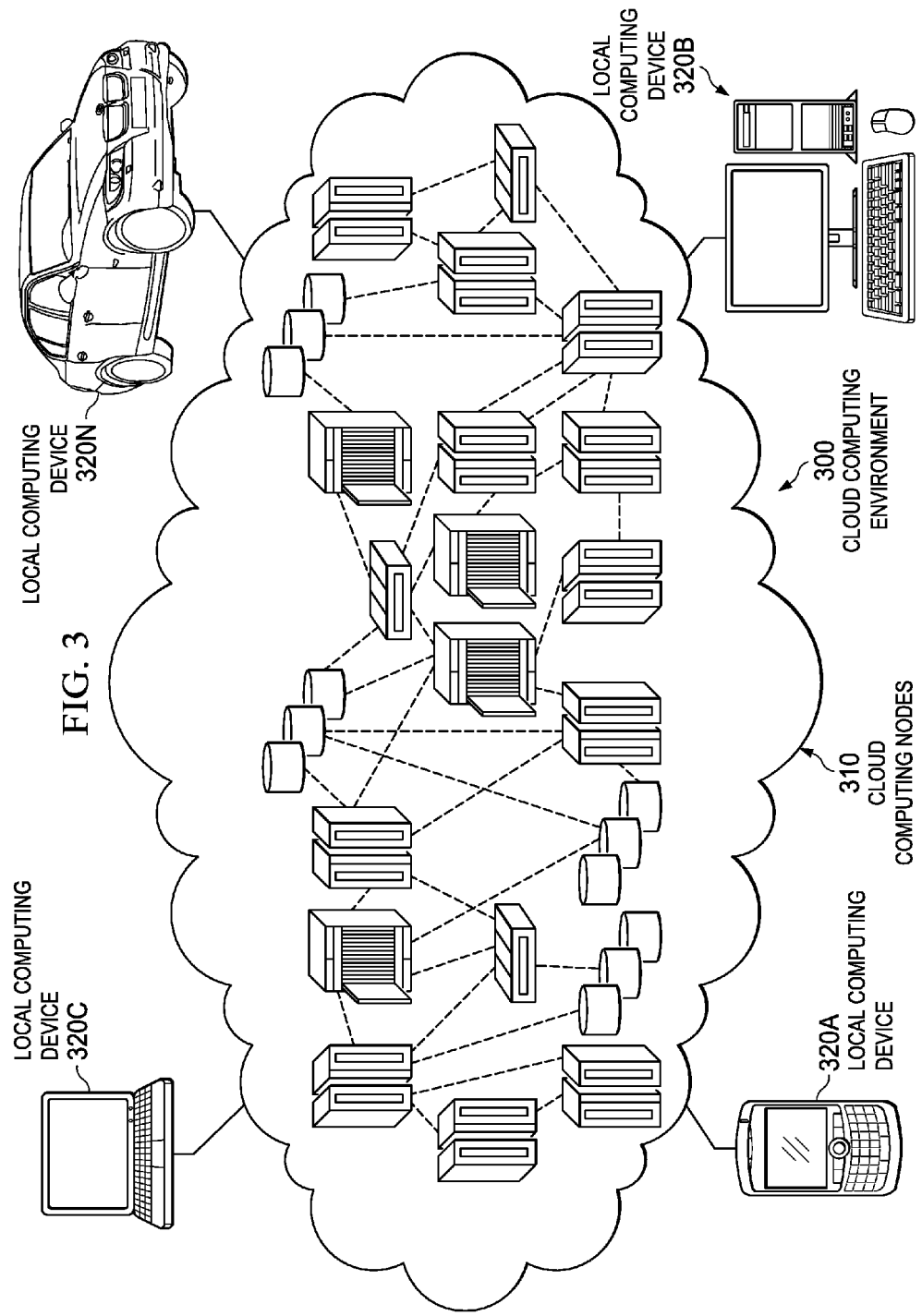
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
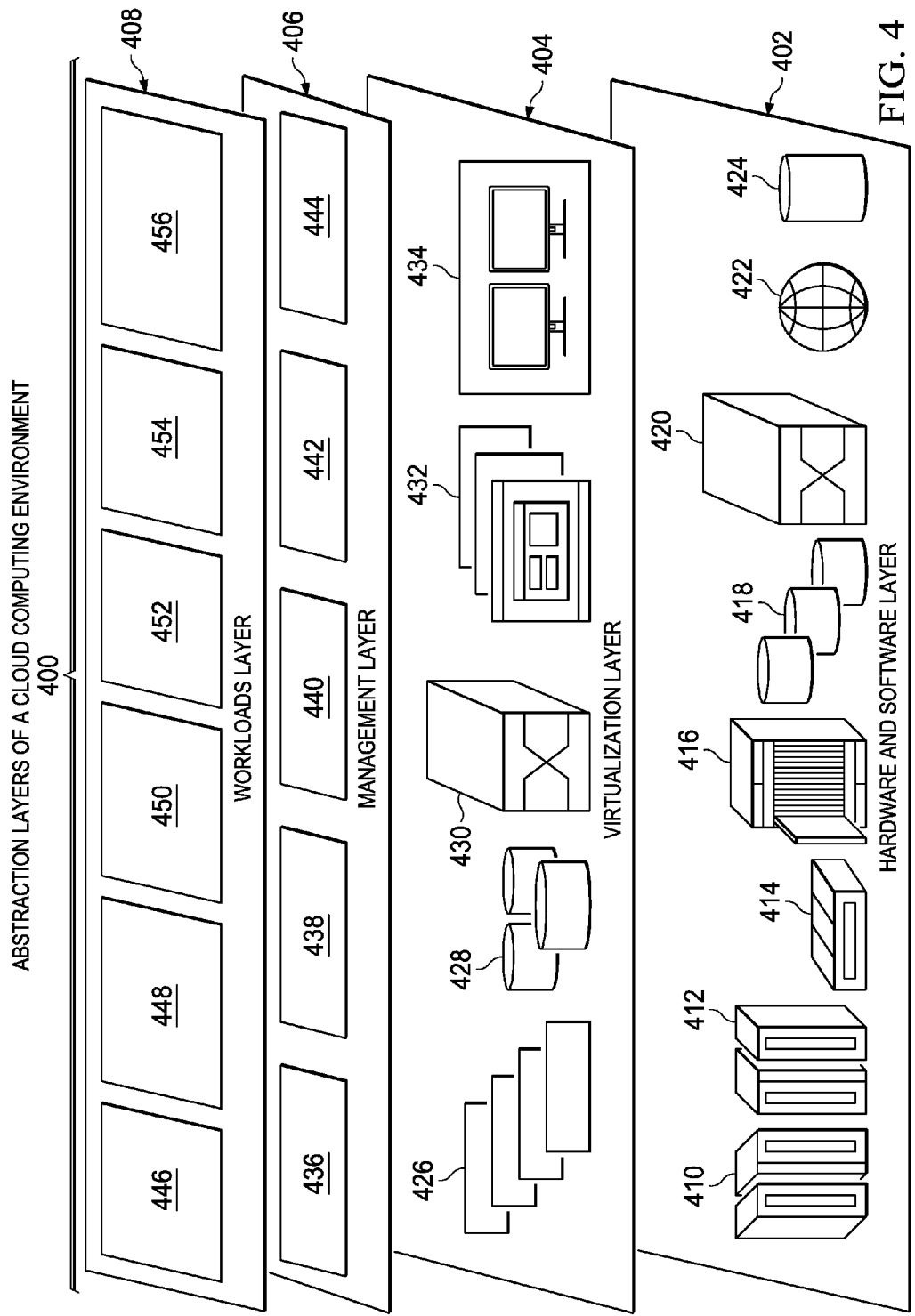
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 includes hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and service management stack configuration transformation and workload migration 456.

In the course of developing illustrative embodiments, it was discovered that transformation from a service management stack configuration corresponding to a source environment to a set of configurations corresponding to a target environment (e.g., cloud native) needs to consider semantic matching to match characteristics of the service management stack (e.g., monitoring) configuration corresponding to the source environment with characteristics of the set of service configurations corresponding to the target environment, a state of the source environment, backup configuration transformation actions, and a goal state of the target environment. In particular, the migration process should consider reducing risks and automating transformation, which includes pattern matching, of the management stack.

Illustrative embodiments provide automated reasoning for risk-aware transformation of service management stacks during workload migrations. Illustrative embodiments identify a set of workloads for migration from a source environment to a target environment in response to receiving a request to migrate the set of workloads. In addition, the request to migrate the set of workloads may include an acceptable level of risk (i.e., a risk threshold level) corresponding to the migration of the set of workloads from the source environment to the target environment. Then, illustrative embodiments initiate the migration of the set of workloads from the source environment to the target environment. Further, illustrative embodiments perform a risk assessment for transformation of a set of service management stack functions associated with the set of workloads. Illustrative embodiments perform semantic matching or mapping between description of functions of a service management stack corresponding to the source environment and descriptions of functions of a service management stack corresponding to the target environment to determine a level of risk associated with the workload migration. Semantic matching is a process for identifying information that is semantically related. For example, given two representations of service management stack functions in source and target environments, matching is a process that identifies those functions that correspond to each other. The level of risk depends on the level of semantic mapping achievable. In other words, an increased level of semantic matching (i.e., above a defined semantic matching threshold level) between functions of the source and target environments equals a decreased level of risk associated with the workload migration.

If illustrative embodiments determine that the level of risk is low (i.e., below the defined risk threshold level), then illustrative embodiments continue with the workload migration and service management stack transformation. Conversely, if illustrative embodiments determine that the level of risk is high, then illustrative embodiments stop the workload migration and service management stack transformation and take appropriate action. Illustrative embodiments may calculate the level of risk using a value between zero and one, for example, where zero is low risk and 1 is high risk. Alternatively, illustrative embodiments may calculate the level of risk using a percentage between zero and one hundred, where zero percent is low risk and one hundred percent is high risk.

After illustrative embodiments calculate the level of semantic matching between service management stack functions, such as, for example, ninety percent of the functions match and are compatible, then illustrative embodiments perform an action based on that calculated level of semantic matching. Actions may include, for example, providing an alert to migration engineers when the level of semantic matching is less than or equal to a threshold level or providing assurance to migration engineers when the level of semantic matching is greater than the threshold level. Illustrative embodiments also may check service level agreements to determine whether a certain level of semantic matching is required before illustrative embodiments permit service management stack transformation to occur. Further, when illustrative embodiments determine that the level of semantic matching is low or below the defined semantic matching threshold level, illustrative embodiments may send a signal to subject matter experts to help provide information on how to achieve a better match using a different function.

Furthermore, illustrative embodiments learn over time what level of semantic matching between service management stack functions is likely to decrease application performance or trigger a malfunction. Moreover, illustrative embodiments learn which levels of semantic matching may be suitable for different types of applications. For example, illustrative embodiments may learn that a Tier 1 application may require ninety nine percent semantic matching between functions, while a Tier 4 application may only require a seventy percent semantic matching in order for illustrative embodiments to proceed with workload migration and service management stack transformation. Illustrative embodiments also may learn from semantic matching problems that have arisen in a history of service management stack configuration transformations and adjust threshold levels accordingly.

Customers may pay to achieve higher levels of semantic matching, which may require more effort and time on the part of the matcher to develop missing functions, for example. A decreased level of risk corresponding to an increased level of semantic matching equals an increase in cost to fill in function gaps. Risk may be considered from different dimensions, such as compliance risk or functioning risk.

Illustrative embodiments also may provide a graphical user interface-based dashboard that assists user migration engineers in managing the service management stack transformation process. The graphical user interface-based dashboard provides graphical indications of level of risk (e.g., high, medium, or low risk) and level of semantic matching (e.g., high, medium, or low matching) through the use of colors. Illustrative embodiments may further use determined level of risk to ensure the services and businesses they support. In addition, illustrative embodiments may use level of risk to trigger more frequent data backups during the service management stack transformation and steady-state operations. Further, in response to a high level of risk, illustrative embodiments may send a signal to a customer to create missing functions. Furthermore, illustrative embodiments may utilize an artificial intelligence agent to automatically bridge the gaps in functions and generate the missing functions on-demand. Moreover, illustrative embodiments may continuously mine semantic matching graphs to detect such function gaps. Examples of cloud management functions may include: a health checking function (i.e., host ping and TCP service monitoring); an automated notification and reboot from monitoring function; a regulatory compliance function; a security compliance function; a performance management function; a backup management function; a storage management function; and a software patch management function.

Illustrative embodiments reduce post-migration configuration effort (i.e., labor), time, and cost. Illustrative embodiments also reduce the time to resolve conflicts between management services that span multiple environments. Further, illustrative embodiments reduce the time for full steady state transformation to cloud-native services. Furthermore, illustrative embodiments decrease ongoing platform and support costs. Illustrative embodiments support customers for continuous development and maintenance in the new environment. Moreover, illustrative embodiments help customers rationalize workloads and reduce the footprint of the workload and dependent service management stacks.

Figure 5:
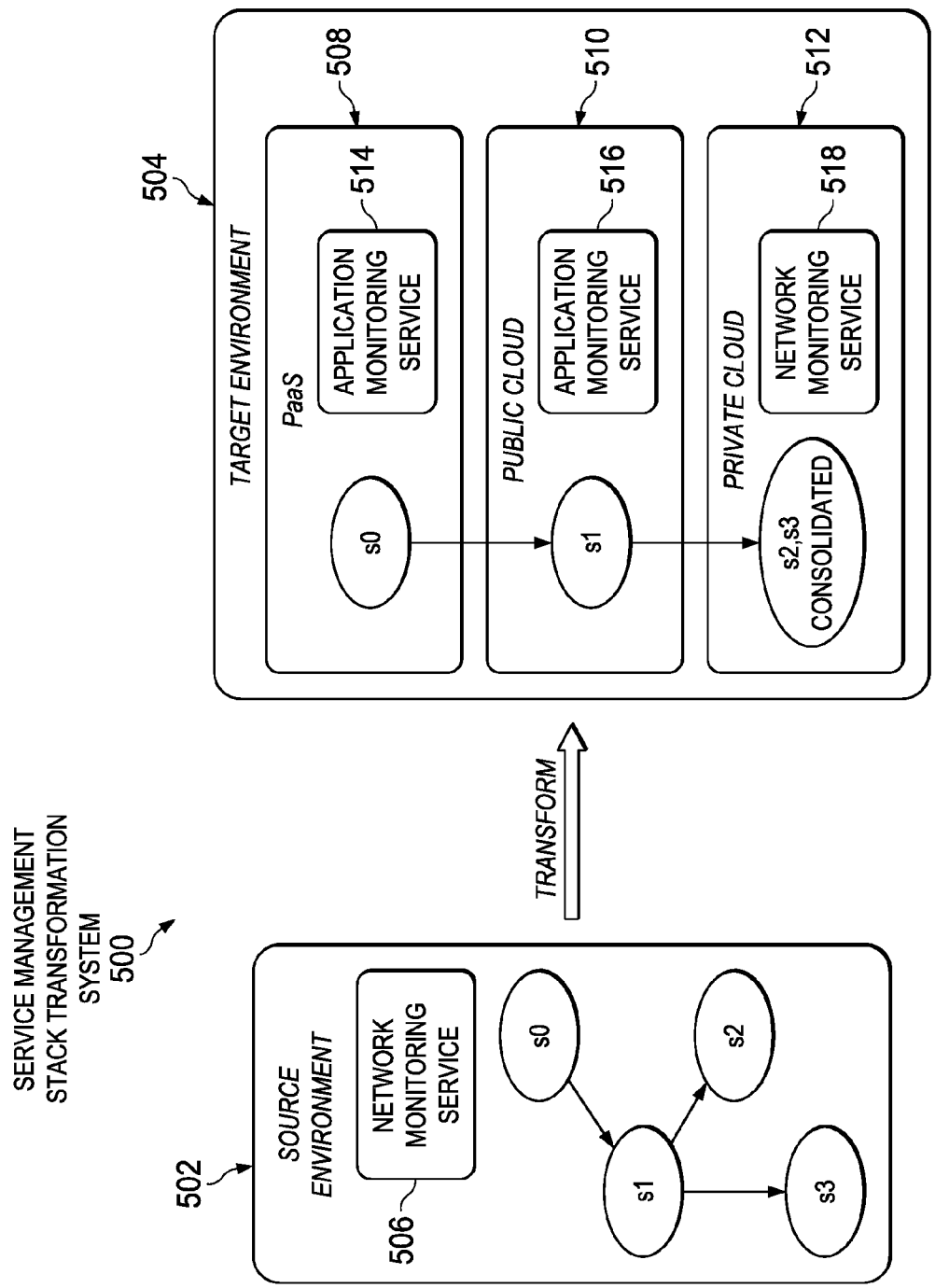
FIG. 5 is a diagram illustrating an example of a service management stack transformation system in accordance with an illustrative embodiment.

With reference now to FIG. 5, a diagram illustrating an example of a service management stack transformation system is depicted in accordance with an illustrative embodiment. Service management stack transformation system 500 is a system of hardware and software components for transforming a source environment service management stack corresponding to a set of workloads to a target environment service management stack during workload migration from the source environment to the target environment. Service management stack transformation system 500 may be implemented in a network of data processing systems, such as network data processing system 100 in FIG. 1 or in a cloud computing environment, such as cloud computing environment 300 in FIG. 3.

In this example, service management stack transformation system 500 includes source environment 502 and target environment 504. Source environment 502 may be, for example, a data center comprising a plurality of servers. Also in this example, source environment 502 provides network monitoring service 506 to a set of workload components "s0", "s1", "s2", and "s3". However, illustrative embodiments receive a request to migrate the set of workload components to target environment 504, which includes Platform as a Service (PaaS) 508, public cloud 510, and private cloud 512. As a result, illustrative embodiments perform a set of transformation tasks in sequence in preparation for the workload migration to the new environment. For example, illustrative embodiments enable application monitoring service 514 on workload component s0 in PaaS 508, which is a Type 1 transformation task. In addition, illustrative embodiments enable application monitoring service 516 on workload component s1 in public cloud 510, which also is a Type 1 transformation task. Further, illustrative embodiments re-enable network monitoring service 518 on consolidated workload components s2 and s3 in private cloud 512 and enable one-way communication between public cloud 510 and private cloud 512, which is a Type 2 transformation task. For unknown misconfiguration errors in the new environment (i.e., target environment 504), illustrative embodiments may engage a subject matter expert to refine Type 2 transformation tasks and validate the tasks, which is a Type 3 transformation task.

Figure 6:
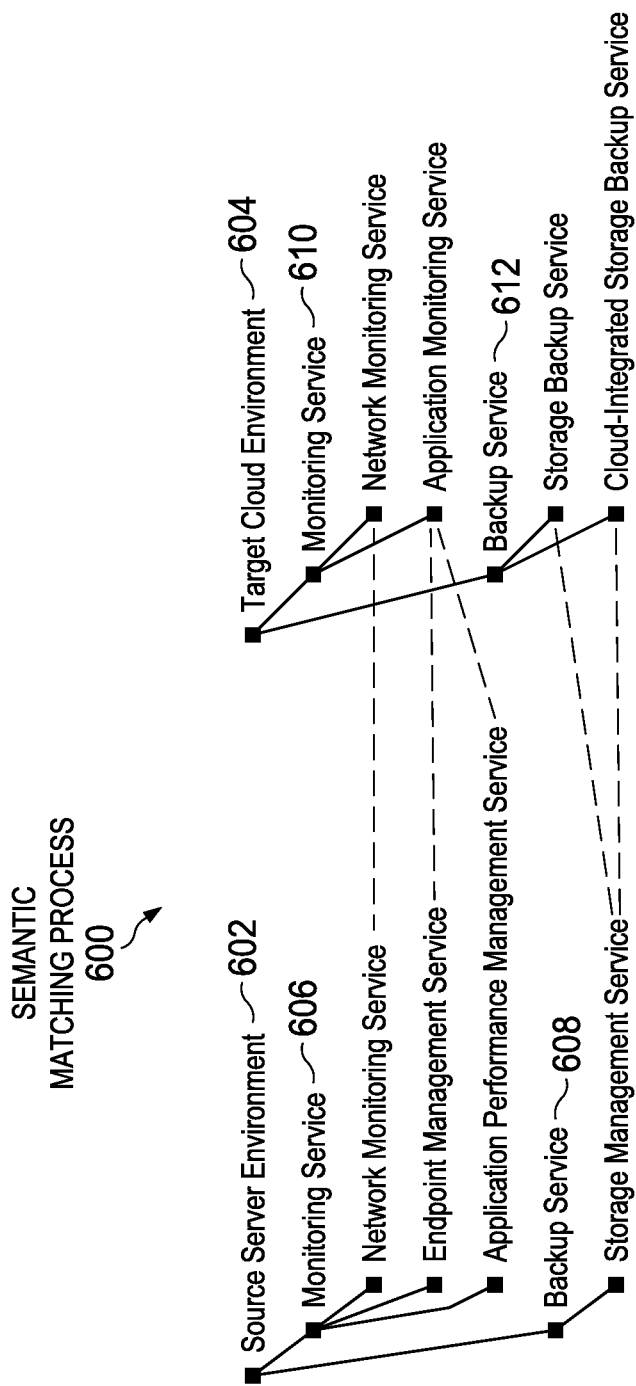
FIG. 6 is an example of semantic matching in accordance with an illustrative embodiment.

With reference now to FIG. 6, an example of semantic matching is depicted in accordance with an illustrative embodiment. Semantic matching process 600 maps service management functions of source server environment 602 to service management functions of target cloud environment 604. Source server environment 602 may be, for example, source environment 502 in FIG. 5. Target cloud environment 604 may be, for example, target environment 504 in FIG. 5.

In this example, source server environment 602 includes monitoring service 606 and backup service 608. Monitoring service 606 includes a network monitoring service, an endpoint management service, and an application performance service. Backup service 608 includes a storage management service. Target cloud environment 604 includes monitoring service 610 and backup service 612. Monitoring service 610 includes a network monitoring service and an application monitoring service. Backup service 612 includes a storage backup service and a cloud-integrated storage backup service.

In this example, semantic matching process 600 maps the network monitoring service of monitoring service 606 to the network monitoring service of monitoring service 610. In addition, semantic matching process 600 maps the endpoint management service and the application performance management service of monitoring service 606 to the application monitoring service of monitoring service 610. Further, semantic matching process 600 maps the storage management service of backup service 608 to the storage backup service and cloud-integrated storage backup service of backup service 612.

Semantic matching is a type of ontology matching that relies on semantic information encoded in lightweight ontologies to identify nodes that contain semantically related information (i.e., semantically related function descriptions). Given any two graph-like structures, such as, for example, classifications, databases, or XML schemas and ontologies, semantic matching is an operation that identifies those nodes in the two graph-like structures which semantically correspond to one another. The example of semantic matching process 600 compares extracts of a migrating server to a target cloud environment.

Semantic matching task creation to bridge function gaps may include foreground tasks, background tasks, and dependent tasks. Foreground tasks may be performed by a subject matter expert. The subject matter expert may detect ontology incompleteness in the foreground of the process (e.g., when creating a service management stack transformation request). These foreground tasks often may be mission-critical tasks, as the main process may not be able to proceed without a description (e.g., how to register a monitoring service node).

A server may perform the background tasks and the dependent tasks. The server in a background task may discover ontology incompleteness or enhancement in a user's response or selection and/or may discover that the background task is dependent on a foreground task. Typically, these background tasks are enhancement tasks (e.g., addition of a property, a change of cardinality of a property, or a change of the IOPE (input, output, precondition, and effect) properties of a function). Dependent tasks augment main semantic tasks. For example, upon addition of a semantic class, illustrative embodiments may generate several subtasks, such as generate relationships for that semantic class, generate properties for that semantic class, and the like. Illustrative embodiments may use dependent tasks to connect services, for example.

With reference now to FIG. 7, an example of a graphical user interface is depicted in accordance with an illustrative embodiment. Graphical user interface (GUI) 700 provides a dashboard for a user or migration engineer to select applications for transformation from a source environment configuration to a new target environment configuration. In this example, GUI 700 includes application name 702, services 704, degree of semantic match 706, criticality of mismatches 708, and gaps in functions 710.

Application name 702 represents a name of a selected application for transformation. Services 704 represent a set of one or more services provided by the selected application. Degree of semantic match 706 represents a level of semantic matching between descriptions of functions corresponding to the source and target environments. Criticality of mismatches 708 represent a value corresponding to how critical a mismatch is between functions of the source and target environments for workload migration. Gaps in functions 710 represent missing functions in the target environment.

Illustrative embodiments employ goal-oriented inference from planning technologies for selecting the actions (i.e., Type I transformation tasks) and assembling the sequence of their execution (i.e., Type II transformation tasks). Illustrative embodiments rely on specification of the domain and data sources.

Illustrative embodiments utilize pattern-based transformation of service management stack configurations from legacy to steady state cloud-native environments. Illustrative embodiments use automated reasoning and conflict resolution for service management stack configuration transformation across multiple cloud environments (e.g., applications spanning multiple environments, servers in different environments not being able to communicate with each other, unsupported functions, and the like). Illustrative embodiments allow rationalization and optimization of service management stack configurations during the transformation process.

Illustrative embodiments verify compliance, compatibility, security, cost, and reputation (e.g., logging failures, issues, et cetera). Illustrative embodiments resolve configuration and compatibility issues using service management stack configuration transformation patterns. Illustrative embodiments also update the service management stack configuration transformation patterns as illustrative embodiments learn new patterns.

Figure 8:
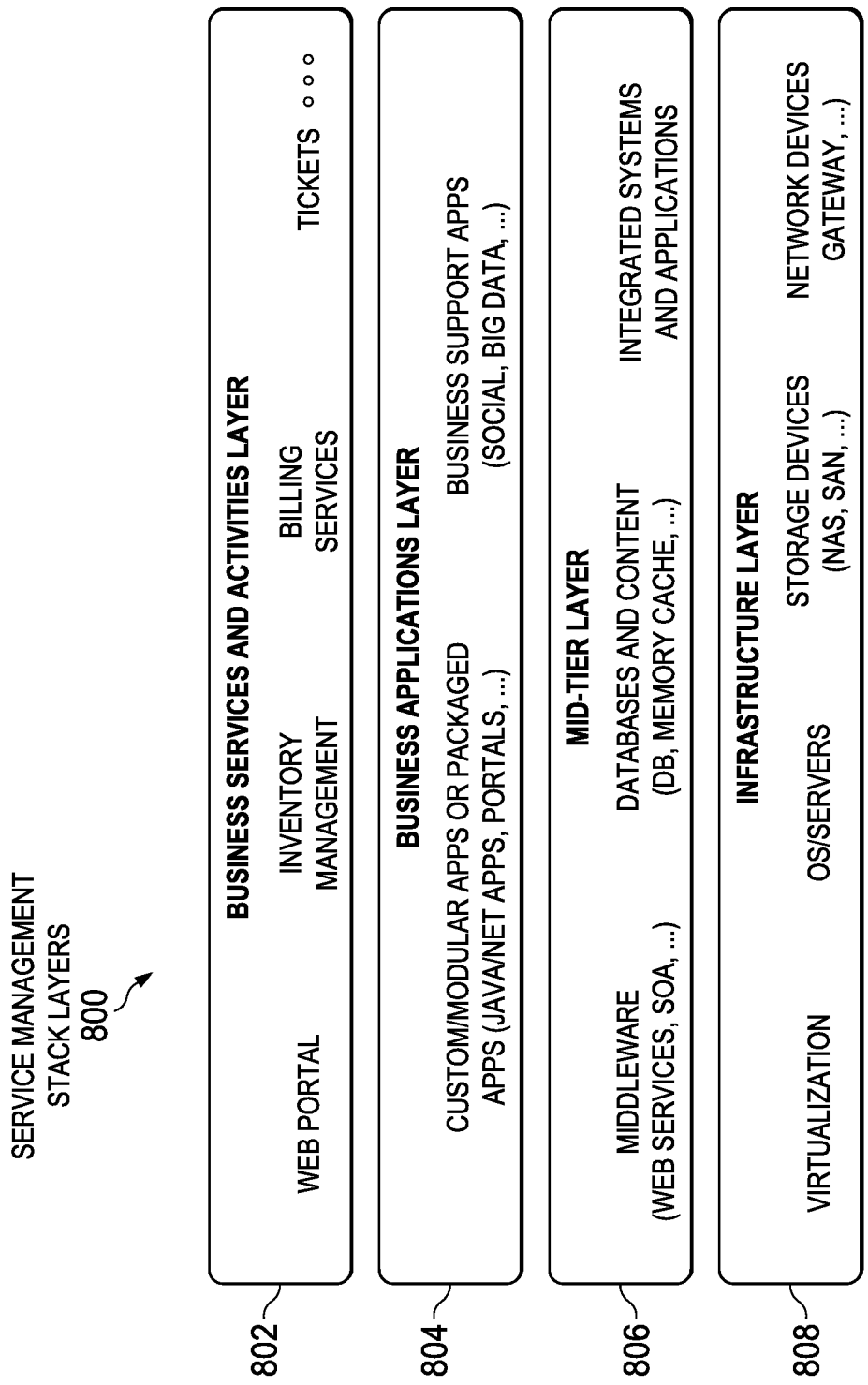
FIG. 8 is an example of service management stack layers in accordance with an illustrative embodiment.
Figure 9A:
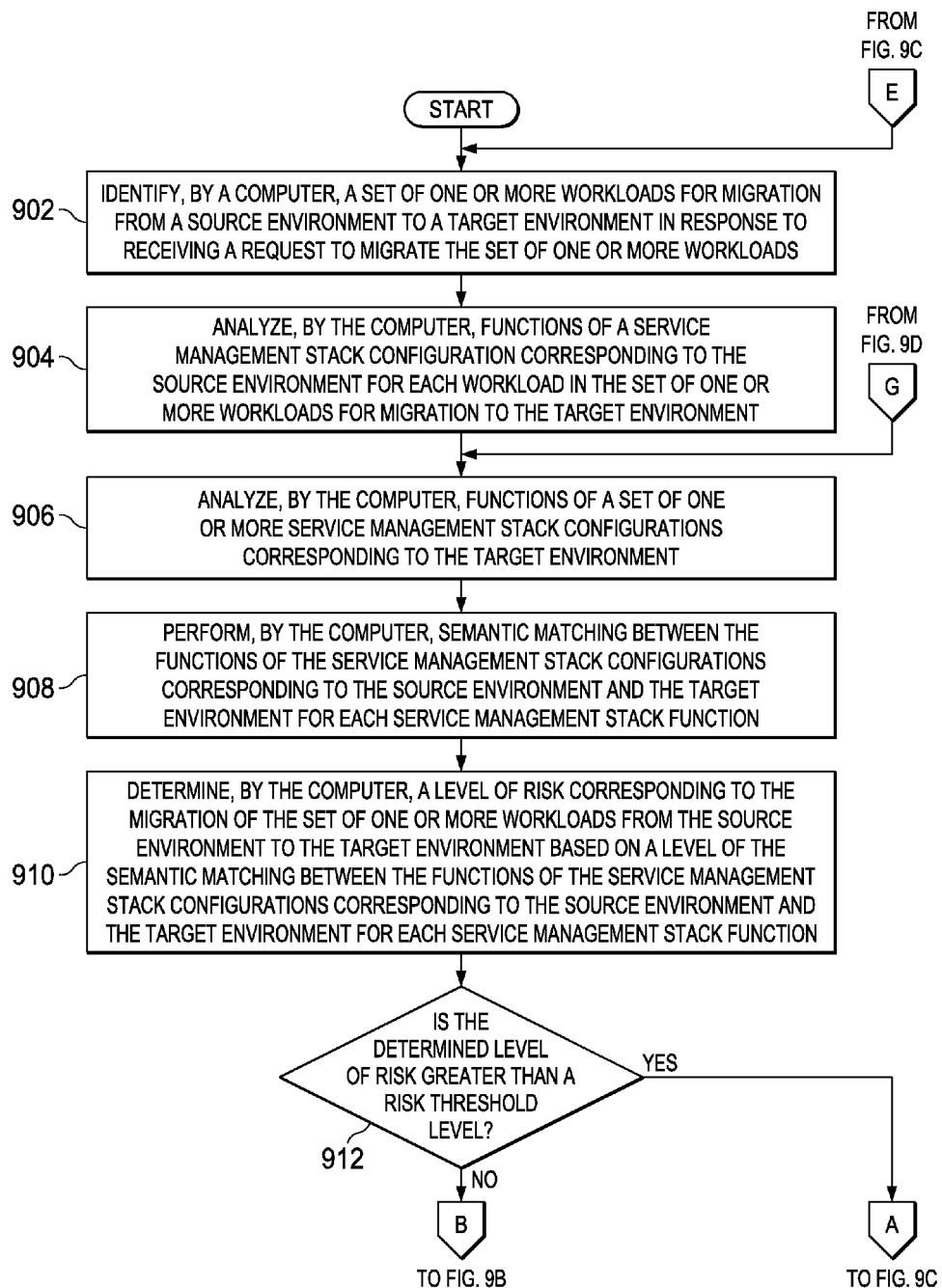
FIGS. 9A-9D are a flowchart illustrating a process for service management stack transformation during workload migration in accordance with an alternative illustrative embodiment.
Figure 9B:
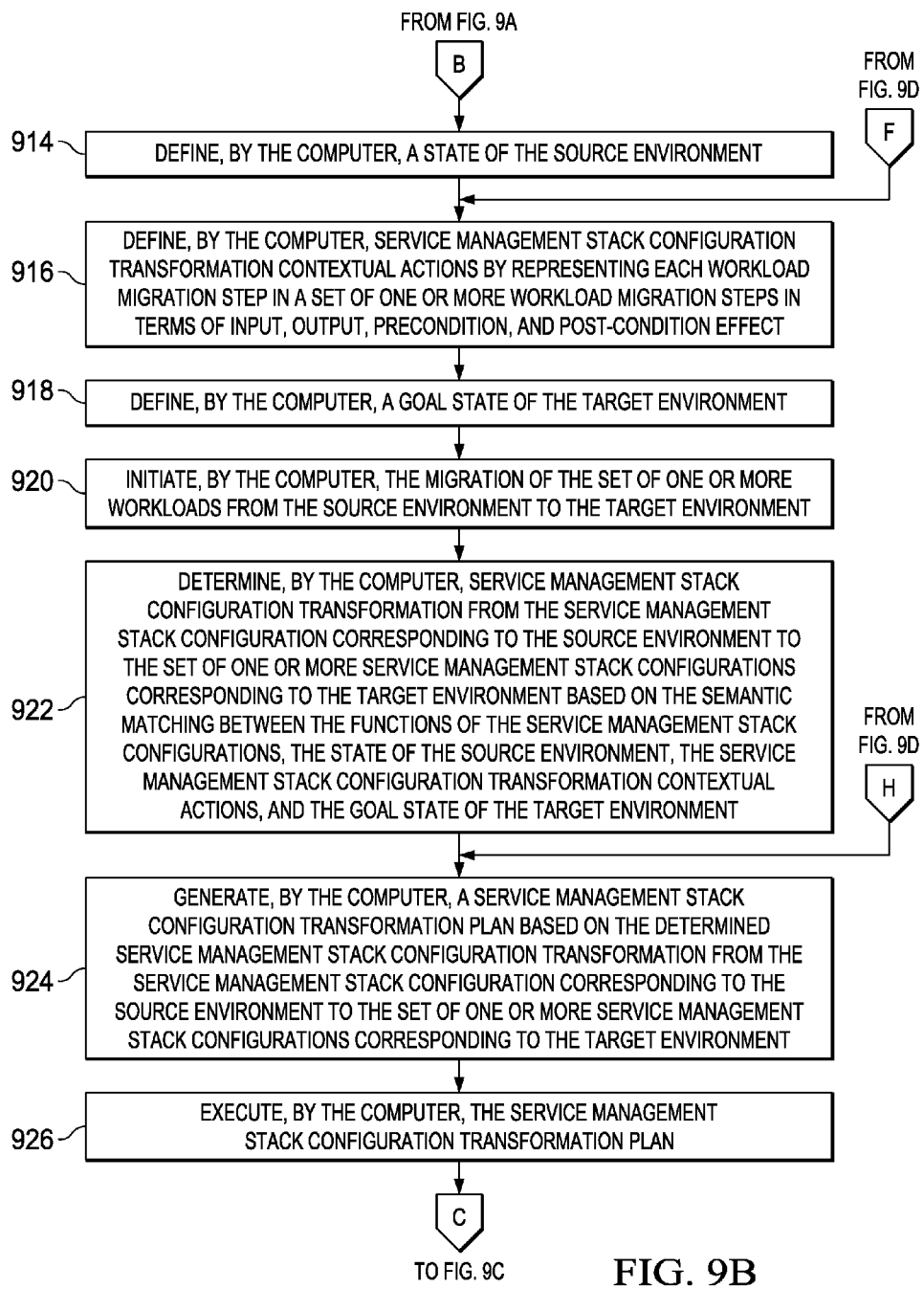
Figure 9C:
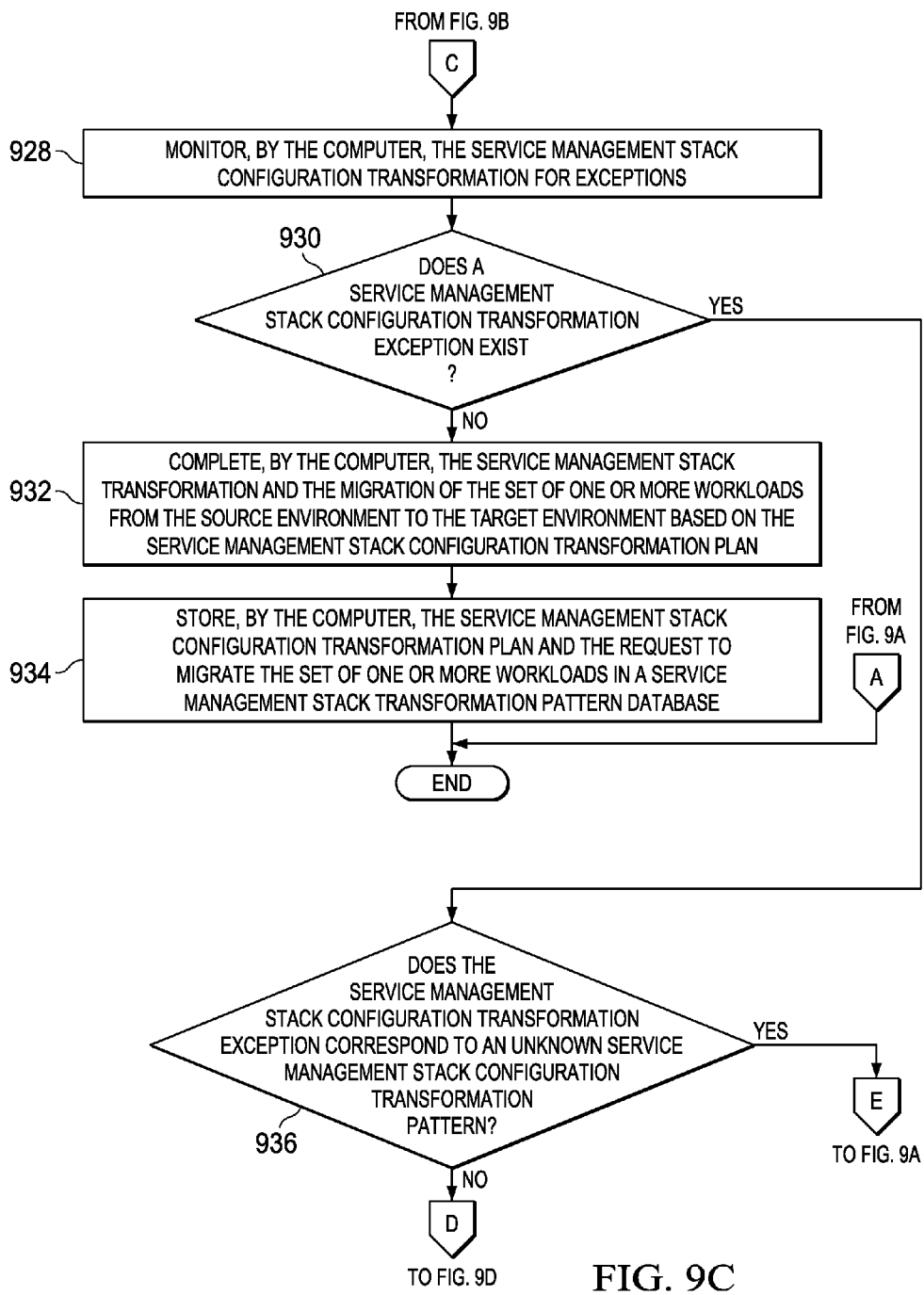
Figure 9D:
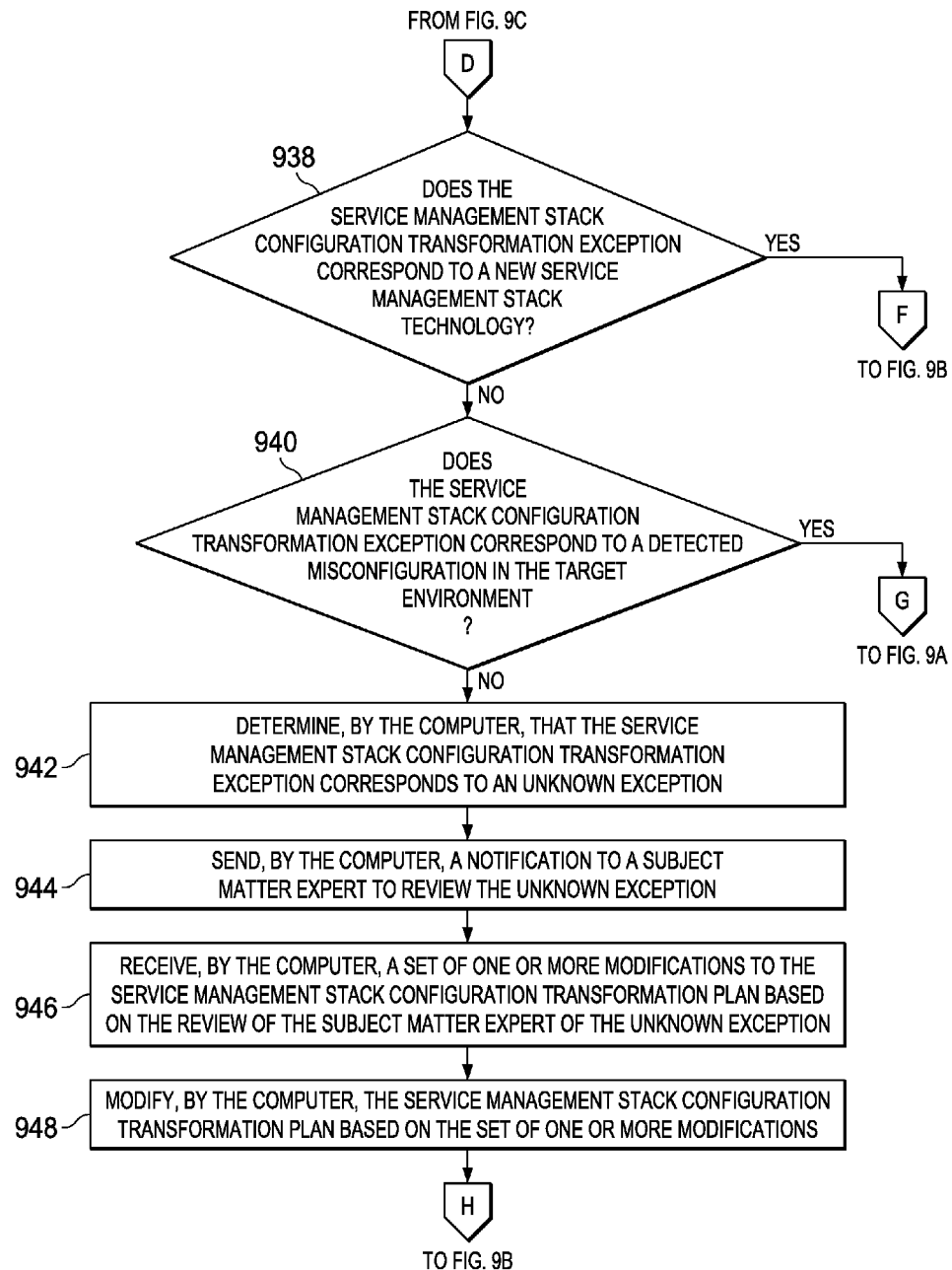

With reference now to FIG. 8, an example of service management stack layers is depicted in accordance with an illustrative embodiment. Service management stack layers 800 represent an example of the layers that may comprise a hybrid cloud service management stack corresponding to a client workload. In this example, service management stack layers 800 include business and activities layer 802, business applications layer 804, mid-tier layer 806, and infrastructure layer 808. However, it should be noted that service management stack layers 800 are intended as examples only and not as limitations on illustrative embodiments. In other words, a service management stack may include more or fewer layers and may include different layers than illustrated. Depending on the cloud services (e.g., IaaS, PaaS, or SaaS) and cloud providers, the different layers of the service management stack may require different management.

With reference now to FIGS. 9A-9D, a flowchart illustrating a process for service management stack transformation during workload migration is shown in accordance with an alternative illustrative embodiment. The process shown in FIGS. 9A-9D may be implemented in a computer, such as, for example, server 104 FIG. 1 and data processing system 200 in FIG. 2.

The process begins when the computer identifies a set of one or more workloads for migration from a source environment to a target environment in response to receiving a request to migrate the set of one or more workloads (step 902). The computer analyzes functions of a service management stack configuration corresponding to the source environment for each workload in the set of one or more workloads for migration to the target environment (step 904). In addition, the computer analyzes functions of a set of one or more service management stack configurations corresponding to the target environment (step 906).

Afterward, the computer performs semantic matching between the functions of the service management stack configurations corresponding to the source environment and the target environment for each service management stack function (step 908). Further, the computer determines a level of risk corresponding to the migration of the set of one or more workloads from the source environment to the target environment based on a level of the semantic matching between the functions of the service management stack configurations corresponding to the source environment and the target environment for each service management stack function (step 910). Subsequently, the computer makes a determination as to whether the determined level of risk is greater than a risk threshold level (step 912).

If the computer determines that the determined level of risk is greater than the risk threshold level, yes output of step 912, then the process terminates thereafter. If the computer determines that the determined level of risk is less than or equal to the risk threshold level, no output of step 912, then computer defines a state of the source environment (step 914). Furthermore, the computer defines service management stack configuration transformation contextual actions by representing each workload migration step in a set of one or more workload migration steps in terms of input, output, precondition, and post-condition effect (step 916). Moreover, the computer defines a goal state of the target environment (step 918).

In addition, the computer initiates the migration of the set of one or more workloads from the source environment to the target environment (step 920). The computer also determines service management stack configuration transformation from the service management stack configuration corresponding to the source environment to the set of one or more service management stack configurations corresponding to the target environment based on the semantic matching between the functions of the service management stack configurations, the state of the source environment, the service management stack configuration transformation contextual actions, and the goal state of the target environment (step 922). Then, the computer generates a service management stack configuration transformation plan based on the determined service management stack configuration transformation from the service management stack configuration corresponding to the source environment to the set of one or more service management stack configurations corresponding to the target environment (step 924).

Further, the computer executes the service management stack configuration transformation plan (step 926). The computer also monitors the service management stack configuration transformation for exceptions (step 928). The computer makes a determination as to whether a service management stack configuration transformation exception exists (step 930).

If the computer determines that no service management stack configuration transformation exception exists, no output of step 930, then the computer completes the service management stack transformation and the migration of the set of one or more workloads from the source environment to the target environment based on the service management stack configuration transformation plan (step 932). In addition, the computer stores the service management stack configuration transformation plan and the request to migrate the set of one or more workloads in a service management stack transformation pattern database (step 934). Thereafter, the process terminates.

Returning again to step 930, if the computer determines that a service management stack configuration transformation exception exists, yes output of step 930, then the computer makes a determination as to whether the service management stack configuration transformation exception corresponds to an unknown service management stack configuration transformation pattern (step 936). If the computer determines that the service management stack configuration transformation exception does correspond to an unknown service management stack configuration transformation pattern, yes output of step 936, then the process returns to step 902 where the process starts again. If the computer determines that the service management stack configuration transformation exception does not correspond to an unknown service management stack configuration transformation pattern, no output of step 936, then the computer makes a determination as to whether the service management stack configuration transformation exception corresponds to a new service management stack technology (step 938).

If the computer determines that the service management stack configuration transformation exception does correspond to a new service management stack technology, yes output of step 938, then the process returns to step 916 where the computer defines the backup configuration transformation contextual actions. If the computer determines that the service management stack configuration transformation exception does not correspond to a new service management stack technology, no output of step 938, then the computer makes a determination as to whether the service management stack configuration transformation exception corresponds to a detected misconfiguration in the target environment (step 940).

If the computer determines that the service management stack configuration transformation exception corresponds to a detected misconfiguration in the target environment, yes output of step 940, then the process returns to step 906 where the computer analyzes functions of the set of one or more service management stack configurations corresponding to the target environment. If the computer determines that the service management stack configuration transformation exception does not correspond to a detected misconfiguration in the target environment, no output of step 940, then the computer determines that the service management stack configuration transformation exception corresponds to an unknown exception (step 942).

Subsequently, the computer sends a notification to a subject matter expert to review the unknown exception (step 944). Afterward, the computer receives a set of one or more modifications to the service management stack configuration transformation plan based on the review of the subject matter expert of the unknown exception (step 946). Then, the computer modifies the service management stack configuration transformation plan based on the set of one or more modifications (step 948). Thereafter, the process returns to step 924 where the computer generates a new service management stack configuration transformation plan.

Figure 10:
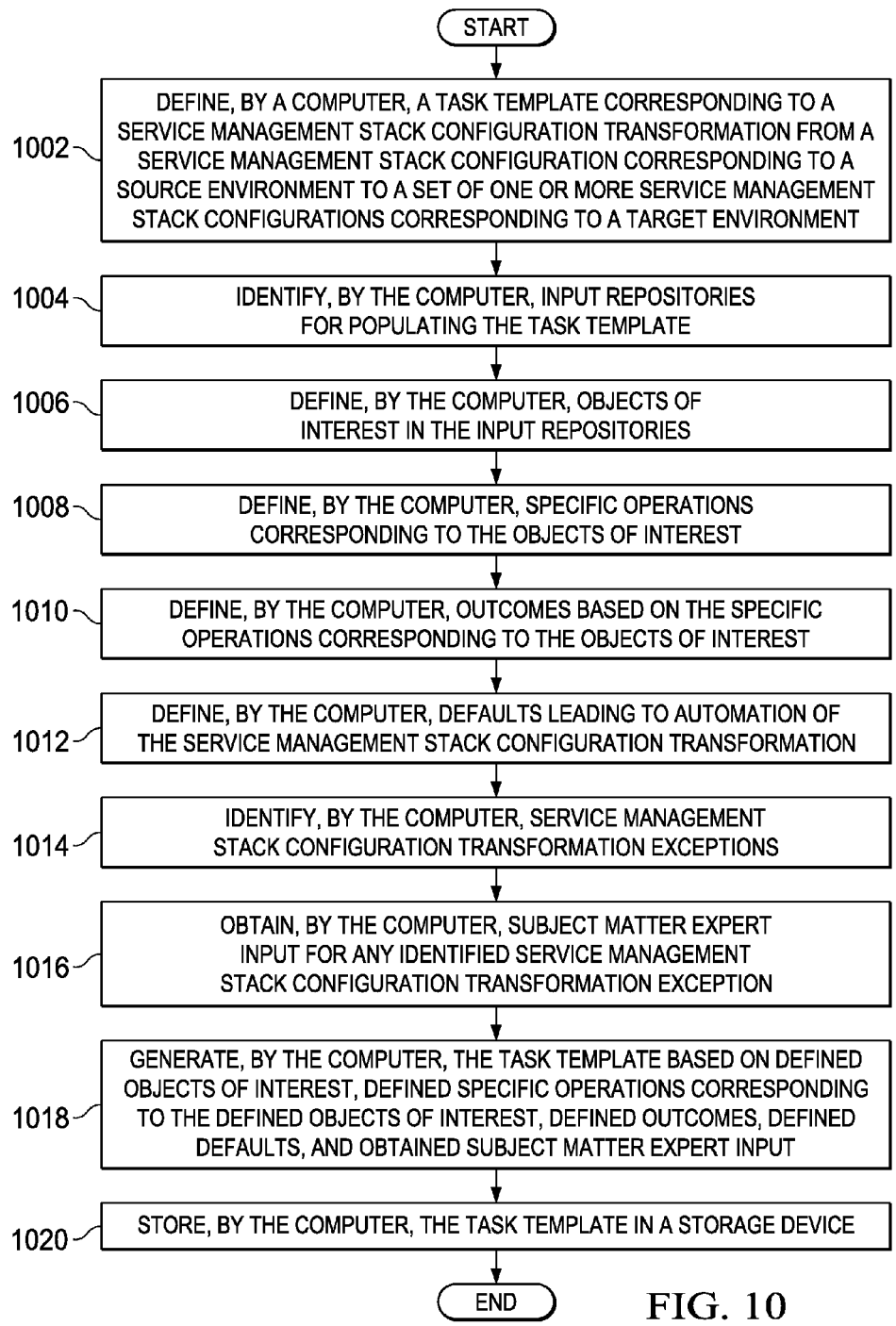
FIG. 10 is a flowchart illustrating a process for task generation in accordance with an alternative illustrative embodiment.

With reference now to FIG. 10, a flowchart illustrating a process for task generation is shown in accordance with an alternative illustrative embodiment. The process shown in FIG. 10 may be implemented in a computer, such as, for example, server 104 FIG. 1 and data processing system 200 in FIG. 2.

The process begins when the computer defines a task template corresponding to a service management stack configuration transformation from a service management stack configuration corresponding to a source environment to a set of one or more service management stack configurations corresponding to a target environment (step 1002). In addition, the computer identifies input repositories for populating the task template (step 1004). Further, the computer defines objects of interest in the input repositories (step 1006).

Furthermore, the computer defines specific operations corresponding to the objects of interest (step 1008). Moreover, the computer defines outcomes based on the specific operations corresponding to the objects of interest (step 1010). The computer also defines defaults leading to automation of the service management stack configuration transformation (step 1012).

Subsequently, the computer identifies service management stack configuration transformation exceptions (step 1014). Afterward, the computer obtains subject matter expert input for any identified service management stack configuration transformation exception (step 1016). Then, the computer generates the task template based on defined objects of interest, defined specific operations corresponding to the defined objects of interest, defined outcomes, defined defaults, and obtained subject matter expert input (step 1018). The computer stores the task template in a storage device (step 1020). Thereafter, the process terminates.

Thus, illustrative embodiments of the present invention provide a computer-implemented method, computer system, and computer program product for performing a risk-aware transformation of a service management stack corresponding to a set of workloads during migration of the set of workloads from a source virtual machine environment to a target virtual machine environment. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for performing a risk-aware transformation of a service management stack during workload migration, the computer-implemented method comprising:

identifying, by a computer, a set of workloads for migration from a source environment to a target environment in response to receiving a request to migrate the set of workloads;

initiating, by the computer, the migration of the set of workloads from the source environment to the target environment;

performing, by the computer, a service management stack configuration transformation from a service management stack configuration corresponding to the source environment to a set of service management stack configurations corresponding to the target environment based on semantic matching between functions of the service management stack configuration corresponding to the source environment and functions of the set of service management stack configurations corresponding to the target environment, a state of the source environment, service management stack configuration transformation actions, and a goal state of the target environment;

determining, by the computer, a level of risk corresponding to the migration of the set of workloads from the source environment to the target environment based on a level of the semantic matching between the functions of the service management stack configuration corresponding to the source environment and the functions of the set of service management stack configurations corresponding to the target environment for each service management stack function;

determining, by the computer, whether the determined level of risk is greater than a risk threshold level; and responsive to the computer determining that the determined level of risk is greater than the risk threshold level, stopping, by the computer, the migration of the of the set of workloads from the source environment to the target environment and the service management stack configuration transformation.

2. The computer-implemented method of claim 1 further comprising:

analyzing, by the computer, the functions of the service management stack configuration corresponding to the source environment for each workload in the set of workloads for the migration to the target environment; and analyzing, by the computer, the functions of the set of service management stack configurations corresponding to the target environment.

3. The computer-implemented method of claim 1 further comprising:

performing, by the computer, the semantic matching between the functions of the service management stack configuration corresponding to the source environment and the functions of the set of service management stack configurations corresponding to the target environment for each service management stack function.

4. The computer-implemented method of claim 1 further comprising:

responsive to the computer determining that the determined level of risk is less than or equal to the risk threshold level, defining, by the computer, the service management stack configuration transformation actions by representing each workload migration step in a set of workload migration steps in terms of input, output, precondition, and post-condition effect.

5. The computer-implemented method of claim 1 further comprising:

generating, by the computer, a service management stack configuration transformation plan based on the service management stack configuration transformation from the service management stack configuration corresponding to the source environment to the set of service management stack configurations corresponding to the target environment.

6. The computer-implemented method of claim 5 further comprising:

executing, by the computer, the service management stack configuration transformation plan.

7. The computer-implemented method of claim 6 further comprising:

monitoring, by the computer responsive to executing the service management stack configuration transformation plan, the service management stack configuration transformation for an exception, wherein the exception is one of a group consisting of an unknown service management stack configuration transformation pattern exception, a new service management stack technology exception, a detected misconfiguration in target environment exception, or an unknown exception.

8. The computer-implemented method of claim 7 further comprising:

sending, by the computer, a notification to a subject matter expert to review the unknown exception;

receiving, by the computer, a set of modifications to a service management stack configuration transformation plan based on the review of the subject matter expert of the unknown exception; and modifying, by the computer, the service management stack configuration transformation plan based on the set of modifications.

9. The computer-implemented method of claim 1, wherein the source environment is a data center environment, and wherein the target environment is a cloud computing environment.

10. The computer-implemented method of claim 1, wherein the source environment is a data center environment, and wherein the target environment is a hybrid cloud environment that includes a set of different cloud computing environments.

11. The computer-implemented method of claim 1, wherein the functions are selected from a group consisting of monitoring functions; regulatory compliance functions; security compliance functions; performance management functions; backup management functions; storage management functions; and software patch management functions.

12. The computer-implemented method of claim 1 further comprising:

generating, by the computer, a task template corresponding to the service management stack configuration transformation from the service management stack configuration corresponding to the source environment to the set of service management stack configurations corresponding to the target environment based on defined objects of interest, defined specific operations corresponding to the defined objects of interest, defined outcomes, defined defaults, and obtained subject matter expert input.

13. A computer program product for performing a risk-aware transformation of a service management stack during workload migration, the computer program product comprising a computer readable storage medium having program instructions embodied therewith, the program instructions executable by a computer to cause the computer to perform a method comprising:

identifying, by the computer, a set of workloads for migration from a source environment to a target environment in response to receiving a request to migrate the set of workloads;

initiating, by the computer, the migration of the set of workloads from the source environment to the target environment;

performing, by the computer, a service management stack configuration transformation from a service management stack configuration corresponding to the source environment to a set of service management stack configurations corresponding to the target environment based on semantic matching between functions of the service management stack configuration corresponding to the source environment and functions of the set of service management stack configurations corresponding to the target environment, a state of the source environment, service management stack configuration transformation actions, and a goal state of the target environment;

determining, by the computer, a level of risk corresponding to the migration of the set of workloads from the source environment to the target environment based on a level of the semantic matching between the functions of the service management stack configuration corresponding to the source environment and the functions of the set of service management stack configurations corresponding to the target environment for each service management stack function;

determining, by the computer, whether the determined level of risk is greater than a risk threshold level; and responsive to the computer determining that the determined level of risk is greater than the risk threshold level, stopping, by the computer, the migration of the of the set of workloads from the source environment to the target environment and the service management stack configuration transformation.

14. The computer program product of claim 13 further comprising:

analyzing, by the computer, the functions of the service management stack configuration corresponding to the source environment for each workload in the set of workloads for the migration to the target environment; and analyzing, by the computer, the functions of the set of service management stack configurations corresponding to the target environment.

15. The computer program product of claim 13 further comprising:

performing, by the computer, the semantic matching between the functions of the service management stack configuration corresponding to the source environment and the functions of the set of service management stack configurations corresponding to the target environment for each service management stack function.

16. The computer program product of claim 13 further comprising:

responsive to the computer determining that the determined level of risk is less than or equal to the risk threshold level, defining, by the computer, the service management stack configuration transformation actions by representing each workload migration step in a set of workload migration steps in terms of input, output, precondition, and post-condition effect.

\* \* \* \* \*